July 7, 1925.
A. I. WOODRING
1,544,791
ADJUSTABLE RESILIENT BRAKE HANGER
Filed Nov. 9, 1922
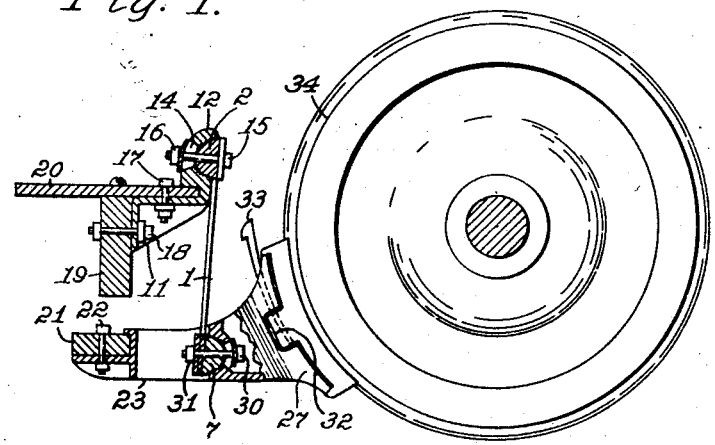
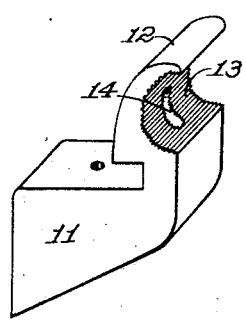
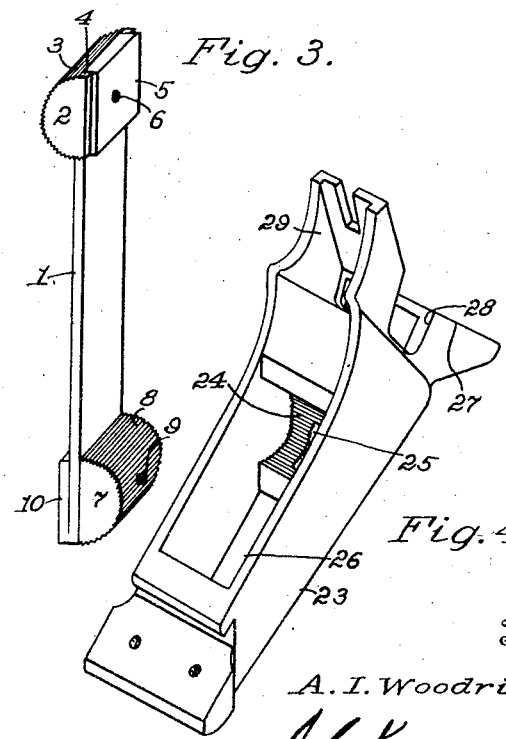
Inventor
A. I. Woodring,
By G. C. Kennedy,
Attorney Patented July 7, 1925.

1,544,791

UNITED STATES PATENT OFFICE.

ALBERTO I. WOODRING, OF WATERLOO, IOWA, ASSIGNOR TO NATIONAL SAFETY DEVICES COMPANY, OF WATERLOO, IOWA, A CORPORATION OF IOWA.

ADJUSTABLE RESILIENT BRAKE HANGER.

Application filed November 9, 1922. Serial No. 599,855.

*To all whom it may concern:*

Be it known that I, ALBERTO I. WOODRING, a citizen of the United States of America, and a resident of Waterloo, Black Hawk County, Iowa, have invented certain new and useful Improvements in Adjustable Resilient Brake Hangers, of which the following is a specification.

My invention relates to improvements in adjustable resilient brake hangers, and the object of my improvement is to supply convenient and inexpensive means for mounting a brake-head resiliently and adjustably relative to the tread of a wheel, whereby the relative position of the brake-head may be changed as desired, or to permit it to conform to wheels of different diameters.

This object has been accomplished by the means which are hereinafter described and claimed, and which are illustrated in the accompanying drawings, in which Fig. 1 is a view, partly in side elevation and partly in vertical longitudinal section, of my improved adjustable resilient brake hanger as supported operatively adjacent to the tread of a car-wheel. Figs. 2, 3 and 4 are respectively perspective views, on a larger scale, of the hanger-bracket, the adjustable resilient hanger, and the brake-block, as disassembled.

The numeral 34 denotes an ordinary flanged car-wheel, the truck and bearings therefor being removed, except the brake-beam 19 with top-plate 20, and the brake-bar 21, all shown in section. A bracket 11 is secured to said brake-beam and to said top-plate by means of bolts 18 and 17 respectively. The bracket 11 has an upwardly-directed projection 12 and the vertical face of this projection opposite the wheel 34 has a transverse semi-cylindric and longitudinally corrugated hollow or bearing-seat 13, with a medial vertically disposed slot 14 extending through it.

The numeral 1 denotes a flat elongated resilient bar used as a brake-hanger, and having its opposite ends at 5 and 10 returned upon itself at opposite sides respectively for reinforcements. Upon the extremities of said bar 1, semi-cylindric corrugated blocks or bosses 2 and 7 are secured as by welding or otherwise contacting with the opposite faces of the bar which are also opposite the turned over end parts 5 and 10. The upper block 2 preferably has end flanges 4 engaging opposite edges of the bar 1 to prevent side play.

The block 2 is mounted in the bearing-seat 13, the respective corrugations of the seat and of the block at 3 fitting closely together, and the block is fastened in said seat in an adjusted tilted position by means of a bolt 15 passed through a bolt-hole in the bar 1 and block 2 and through the slot 14 in said projection 12, and held by the nut 16.

The numeral 23 denotes the brake-block which has on one face 27 a transverse hollow or seat 28 to receive a lug 32 on the brake-shoe. A headed pin 33 is removably mounted in alined openings 29 in said brake-block and lug 32. The other end of the brake-block 23 is bolted to the brake-bar 21 by means of bolts 22. The brake-block has a medial hollow 26 crossed by an integral septum which has a semi-cylindric bearing-seat 24 provided with the longitudinal corrugations shown, the septum having an elongated vertical slot 25 positioned medially in said seat. The lower corrugated boss or block 7 on the hanger 1 is mounted in and to fit said bearing-seat 24, with mating corrugations 8, and may be secured adjustably to vary the tilt of the brake-block by means of a bolt 30 passed through the bolt-hole 9 and said slot 25 and by a nut 31.

As stated, the hanger-bar 1 may be tilted adjustably at its upper adjustable connection with said bracket 11—12 to position the brake-block and shoe at different distances from the tread of the wheel 34, while the brake-block itself may be also adjustably tilted relatively to the bar 1 and the wheel 34, whereby it may be positioned to be engaged properly relatively to wheels of different diameters. Either adjustment may be quickly effected by merely loosening the nuts to allow of rocking the corrugated block 2 or the brake-block 23.

Having described my invention, what I claim as new, and desire to secure by Letters Patent, is:

In combination, a brake-bar, a bearing-body removably secured thereon and having a semi-cylindrical bearing-seat furnished with numerous projections, also having a longitudinal slot therethrough, an apertured semi-cylinder having on its cylindrical face mating projections to releasably interlock with the said projections on the bearing-seat for longitudinal rocking adjustment relative thereto, a brake-head having a semi-cylindrical bearing-seat furnished with numerous projections, also having a longitudinal slot therethrough, an apertured semi-cylinder having on its cylindrical face mating projections to releasably interlock with the said projections on the brake-head bearing-seat, to permit a longitudinal rocking adjustment relative thereto, a bar spring-hanger having apertures in its opposite end parts, the semi-cylinders having flat faces opposite their cylindrical faces with these faces abutting opposite faces of the hanger-bar to aline the apertures thereof with the slots in said bearing-seats, bolts traversing the alined apertures and slots, and clamping-devices on the bolts for releasably clamping the bar to the semi-cylinders and bearing-bodies adjustably.

Signed at Waterloo, Iowa, this 27th day of October, 1922.

ALBERTO I. WOODRING.